Figure 1:
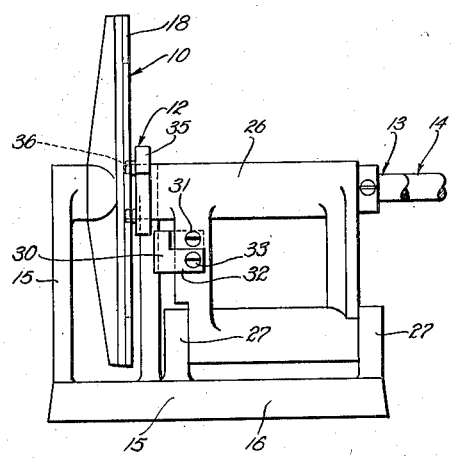

Feb. 12, 1935.  W. L. WRIGHT  1,990,684
INTERMITTENT MOVEMENT MECHANISM
Filed Sept. 23, 1933

Inventor
Walter L. Wright
By
His Attorney

Patented Feb. 12, 1935

1,990,684

UNITED STATES PATENT OFFICE 1,990,684

INTERMITTENT MOVEMENT MECHANISM

Walter L. Wright, Santa Monica, Calif., assignor to Synchrome Corporation, Santa Monica, Calif., a corporation of California Application September 23, 1933, Serial No. 690,712

5 Claims. (Cl. 74—436)

This invention relates to an intermittent movement mechanism, and relates more particularly to an intermittent movement mechanism for use in motion picture apparatus, such as motion picture projectors.

The usual types of intermittent movement mechanism employed in motion picture apparatus operate to turn the intermittently operated film sprocket shaft 90°, or one-fourth of a revolution, for each revolution of the driving shaft. In handling certain types of colored motion picture film, it is necessary to impart comparatively long intermittent movement to the film. To adapt the apparatus involving the usual types of intermittent movement devices to handle colored film, it has been found necessary to make the film advancing sprockets of very large diameter to provide for the necessary movement of the film. Further, it is the common practice to make the lock parts of the intermittent movement mechanisms of the same active diameter as the film advancing sprocket, so that sprockets of large diameter necessitate very large intermittent movement mechanisms.

It is a general object of the present invention to provide a simple, practical, and effective intermittent movement mechanism that operates or turns the film sprocket shaft approximately 180°, or one-half of a revolution, for each revolution of the driving shaft. As the movement mechanism provided by the present invention is operable to turn the film sprocket 180° for each rotation of the driving shaft, the film advancing sprocket may be of comparatively small diameter and yet provide for the proper movement of the film.

It is another object of this invention to provide an intermittent movement mechanism that is particularly compact and light in weight. In accordance with the construction provided by the invention, the only parts carried by the intermittently operated sprocket shaft are a small cross arm and two lock pins.

It is another object of the invention to provide an intermittent movement mechanism of the character mentioned that is such that the time in which the sprocket shaft is in motion is of very short duration relative to the time or period in which it is stationary. The sprocket shaft is in motion a very short period of time as compared with the time that it is still or stationary, so that a maximum amount of light is projected through the film when stationary at the projecting aperture to produce clearer pictures with less flicker.

It is a further object of the invention to provide an intermittent movement mechanism of the character mentioned that has a minimum number of working parts, so that it operates with great accuracy. The mechanism provided by the present invention has only two lock parts of pins carried by the sprocket shaft that co-operate with a continuously rotating fly wheel or cam wheel.

Figure 2:
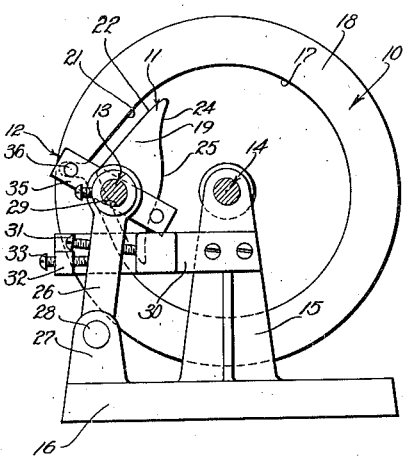
Figure 3:
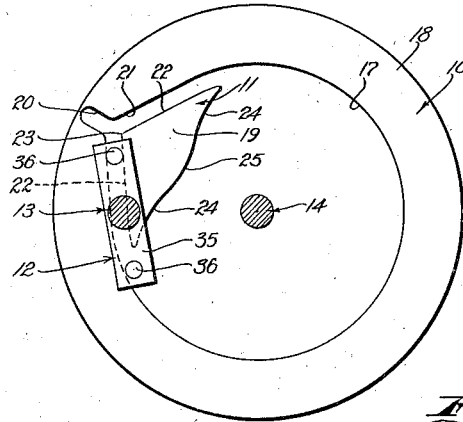
Figure 4:
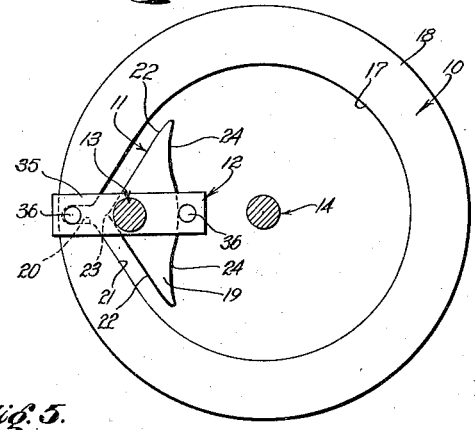
Figure 5:
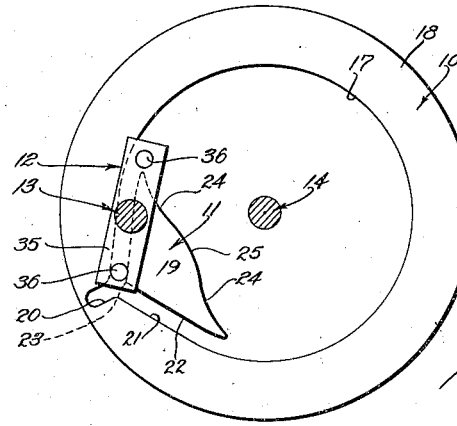

Other objects and features of my invention will be best and more fully understood from the following detailed description of a typical form and application of the invention, throughout which description reference will be had to the accompanying drawing, in which:

Fig. 1 is a side elevation of the movement mechanism provided by the present invention. Fig. 2 is an end view of the mechanism, illustrating the parts in an intermediate position where the sprocket shaft is being turned. Figs. 3, 4, and 5 are enlarged diagrammatic views illustrating the wheel and lock parts in various positions.

Throughout the following detailed description, the invention will be disclosed in a form intended primarily for imparting intermittent movement to the film feed sprocket shaft of a motion picture projector, or the like. It is to be understood that the invention is capable of use in various situations, and that the invention is not to be taken as restricted to the particular form or application about to be described.

The mechanical movement or movement mechanism provided by this invention includes, generally, a continuously rotating wheel 10, cam means 11 on the wheel 10, and lock means 12 carried on a sprocket shaft 13 to co-operate with the wheel 10 and the cam means 11.

The wheel 10 is in the nature of a fly wheel or cam wheel and is mounted on a continuously driven or rotated shaft 14. The shaft 14 may be considered as being one of the drive shafts of a projector, or the like, and may be rotated by the main gear of the projector or apparatus through suitable gearing. In the drawing, I have shown an end portion of the shaft 14 rotatably supported by spaced bearing brackets 15. The brackets 15 are carried by a suitable mounting plate 16. In practice, the shaft 14 is normally continuously rotated at comparatively high speeds.

The wheel 10 is fixed on the shaft 14 at a point between the spaced bearing brackets 15. The wheel 10 may be a simple, integral member of suitable weight to possess the desired momentum when in operation to insure smoothness and accuracy in the operation of the mechanism. In accordance with the invention, one side of the wheel 10 is chambered or relieved to have an inwardly facing annular shoulder 17. The major portion of the shoulder 17 is concentrically curved about the axis of rotation of the wheel 10. In the preferred construction, the shoulder 17 is spaced inwardly from the periphery of the wheel to provide an annular flange or rim 18.

The cam means 11 is provided to co-operate with the lock means 12 to cause the desired intermittent movement to be imparted to the sprocket shaft 13. The cam means 11 includes a cam projection or cam part 19 on the wheel 10 spaced inwardly of the annular shoulder 17. In accordance with the invention, the inner and outer sides or edges of the cam part 19 are of peculiar configuration or formation to cause the desired movement or operation of the lock means 12, as will be hereinafter described. A slot or notch 20 is provided in the rim 18 to extend radially outward from the shoulder 17. The outer closed end of the notch 20 is rounded, while the opposite sides of the notch may be substantially radial. The shoulder 17 is provided with tangential portions 21 which extend outward from the opposite sides of the notch 20. The outer ends of the tangential shoulder parts 21 gradually and evenly join the concentrically curved major portion of the shoulder.

The outer edge of the cam part 19 consists of two like cam faces 22. The cam faces 22 are spaced from and substantially parallel with the tangential shoulder portions 21. The inner ends of the cam faces 22 join at a point or apex 23 which is directly inward of the notch 20. The extreme outer end parts of the cam faces 22 may be curved parallel with the major curved part of the shoulder 17, as illustrated in the drawing.

The inner side or edge of the cam part 19 consists of two like cam faces 24. The outer ends of the cam faces 24 join the ends of the cam faces 22 at somewhat rounded points at the opposite ends of the cam part. The faces 24 extend from the opposite ends of the cam part 19 to join at a central smooth or regular convex curve, as at 25 throughout the drawing. In the preferred construction, the cam faces 24 are slightly longitudinally curved or concaved throughout their lengths.

The shaft 13 may be considered as the shaft carrying the intermittently operated sprocket for advancing the film. The shaft 13 is the driven shaft of the intermittent mechanism and, in accordance with the invention, is turned approximately 180° upon each complete rotation of the wheel 10. In accordance with the broader aspects of the invention, the sprocket shaft 13 may be mounted or supported in any suitable manner; however, the present invention provides an improved means for supporting the shaft 13 whereby it may be adjusted relative to the continuously rotating shaft 14 to provide for the correct and accurate co-operation between the cam means 11 and the lock means 12. An adjustable bearing member 26 is pivotally mounted on the base 16 to rotatably support an end part of the shaft 13. Spaced upwardly projecting lugs 27 are provided on the base 16, and the lower end part of the member 26 is pivotally supported between the lugs 27. A pivot pin 28 is carried by the member 26 and is rotatable in openings in the lugs 27 to pivotally support the member 26. The shaft 13 passes through an opening 29 in the outer end of the bearing member 26 and projects from an end of the bearing member 26 adjacent the wheel 10. The shaft 13 extends substantially parallel with the continuously rotating shaft 14, and the pivotal bearing member 26 supports the shaft 13 so that it may be adjusted toward and away from the continuously driven shaft.

The invention provides means for releasably or adjustably setting the bearing member 26 in the desired direction. An arm 30 projects outwardly from one of the brackets 15, and a set screw 31 is threaded through an opening in the member 26 to engage the arm 30. The set screw 31 may be employed to adjust the bearing member 26 outwardly relative to the shaft 14 and normally holds the member 26 and the shaft 13 against inward movement toward the shaft 14. The arm 30 extends outwardly beyond the bearing member 26, and a block or finger 32 is provided on its outer end. A set screw 33 is threaded through an opening in the finger 32 to engage the bearing member 26. The set screw 33 may be employed to adjust the bearing member 26 toward the shaft 13, and normally holds the bearing member against outward movement.

The lock means 12 is carried by the driven or sprocket shaft 13 and co-operates with the shoulder 17 during the major portion of each rotation of the wheel 10 to hold the shaft 13 against rotation, and co-operates with the cam means 11 to turn the shaft 13 approximately 180° during the remaining part of the rotation of the wheel. The lock means 12 is mounted on the end portion of the shaft 13 projecting from the bearing member 26 and includes a cross head or cross arm 35 fixed on the shaft and lock pins 36.

The cross arm 35 is an elongated member and is arranged diametrically relative to the shaft 13. The cross arm 35 is fixed on the shaft 13 to rotate therewith, and its opposite end parts project radially outward equal distances from the shaft. The cross arm 35 is positioned on the shaft 13 to pass the rim 18 with suitable clearance.

In accordance with the invention, the are two lock pins 36 carried by the cross arm 35. A pin 36 projects axially from a point adjacent each end of the cross arm 35. The pins 36 are equally spaced from the center of rotation of the shaft 13 and are spaced and related so as to be slidably engaged by the major concentric portion of the shoulder 17 during the greater part of each revolution of the wheel 10 to hold the shaft 13 against movement or turning. The lock pins 36 are of round cross section, and their outer ends have suitable clearance with the face or side of the wheel 10. The pins 36 are adapted to be engaged by the inner and outer cam faces of the cam part 19 and the faces 21 and the notch 20 of the wheel 10 to impart a movement of 180° to the shaft 13 during each complete revolution of the wheel 10. Accordingly, the pins 36 are proportioned to slidably pass through the channel between the cam part 19 and the faces 21 and to fit into the notch 22.

During operation of the mechanism, both of the lock pins 36 slidably engage the concentrically curved major portion of the shoulder 17 during the greater portion of each rotation of the wheel 10 to hold the sprocket shaft 13 against turning. When the wheel 10 reaches a position where the cam part 19 starts to pass the end of the shaft 13, as illustrated in Fig. 3 of the drawing, one lock pin 36 passes into the channel between the faces 21 and 22, while an outer cam face 24 slidably engages the other lock pin 36. Further turning of the wheel 10 brings the wheel 10 to a position where the notch 20 receives the outermost pin 36. This relationing of parts is illustrated in Fig. 4 of the drawing. The forward inner cam face 24 co-operates with the innermost pin 36 to cause turning of the wheel to insure passage of the outer pin 36 into the slot 20. It will be apparent how the tangential cam faces 21 and 22 and the apex 23 effectively guide the outermost pin 36 into the notch 20. Up to this point, the cross arm 35 has completed approximately one-half of its movement, and it is to be noted that the greater portion of this movement occurs when the pin 36 passes into the notch 20. During engagement of the outer pin 36 between the tangential parts 21 and 22, the inner cam face 24 slidably engages the innermost pin 36. When the outer pin is in the inner portion of the notch 20, the inner pin 36 passes the rounded point 25 at the inner edge cam with clearance. When the pin is in the notch 20, a positive drive is obtained between the wheel and shaft 13 so that there is no necessity for engagement between the inner pin 36 and the inner edge of the cam 19. As the two pins 36 are both continuously engaged by the cam parts on the wheel 10 during passage of the pin 36 into the notch 20, a smooth and effective drive is obtained between the wheel and the shaft 13. As the wheel 10 continues to rotate or turn, the notch 20 co-operates with the outermost pin 36 to further turn the cross arm 35 and the shaft 13, so that the innermost pin 36 completely passes over the curve 25 and comes into sliding engagement with the upper cam face 24. Further movement of the wheel 10 moves the notch 20 out of engagement with the pin 36, so that the tangential channel between the faces 21 and 22 slidably passes the outermost pin, while the inner cam face 24 slidably engages the inner pin. The last mentioned relationship of parts is illustrated in Fig. 5 of the drawing. Upon further movement of the wheel 10 from the position illustrated in Fig. 5 of the drawing, the tangential faces 21 and 22 co-operate with the pin 36 so that the arm 35 is turned to a position where both of the pins 36 slidably engage the concentrically curved shoulder 17 to lock the shaft 13 against further motion during the remainder of the cycle of operation.

It is believed that the utility and practicability of the mechanism provided by this invention will be readily apparent from the foregoing detailed description. It is to be noted that the mechanism operates to hold the shaft 13 against turning during the greater portion of each revolution of the wheel 10 and turns the shaft 13 approximately 180° during the small remainder of the rotation of the wheel. As the two pins 36 are both continuously in engagement with parts of the cam means 11 during the turning of the shaft 13, with the exception of the time that the outer pin occupies the inner portion of the notch 20, the shaft 13 is operated positively and smoothly to insure effective advancement of the film. The cross arm 35 and the lock pins 36 are the only parts carried by the sprocket shaft 13. It will be apparent how a very fine adjustment may be obtained by setting the bearing member 26 by means of the set screws 31 and 33 and by noting the clearance or play of the pins 36 when they are successively brought into the notch 20. It is obvious that the proportions of the mechanism may be varied considerably to provide for variations in the relation between the period during which the shaft 13 is stationary and the period during which it is in motion.

Having described my invention, I claim:

1. An intermittent movement mechanism of the character described including, a continuously rotating wheel having an annular internal shoulder, a shaft, lock parts carried by the shaft and spaced apart diametrically of the shaft, the shoulder having a portion designed to co-operate with the lock parts to hold the shaft against rotation during a major portion of each rotation of the wheel, and cam means for cooperating with the lock parts to turn the shaft approximately 180° during the remainder of each rotation of the wheel, said cam means including a cam on the wheel spaced from said shoulder, there being a notch in the shoulder outwardly of the cam having substantially parallel walls, tangential faces on the shoulder joining the walls of the notch, and faces on the outer side of the cam spaced from and parallel to the tangential faces, the cam being operable to pass between and slidably co-operate with both of the lock parts so that the said parallel faces guide one of the parts into and out of the notch and so that the inner side of the cam remains in sliding co-operation with the other lock part during the passage of the said part into and out of the notch.

2. An intermittent movement mechanism of the character described including, a continuously rotating wheel having an annular internal shoulder, a shaft, a cross arm on the shaft, lock pins on the cross arm spaced apart diametrically relative to the shaft, the shoulder having a portion designed to co-operate with the lock pins to hold the shaft against rotation during the greater part of each rotation of the wheel, and means for turning the shaft approximately one-half of a revolution during the remaining part of each rotation of the wheel, said means including a cam on the wheel spaced inward from the shoulder, there being a notch in the shoulder at the cam having substantially parallel side walls, tangential faces on said shoulder joining the side walls of the notch, the cam having cam faces on its outer edge parallel to the tangential faces to guide a pin into and out of the notch and a cam face on its inner edge to slidably engage the other pin.

3. An intermittent movement mechanism of the character described including, a continuously rotating wheel having an annular internal shoulder, a shaft, lock parts carried by the shaft and spaced apart diametrically of the shaft, the shoulder having a portion designed to co-operate with the lock parts to hold the shaft against rotation during a major portion of each rotation of the wheel, and cam means for co-operating with the lock parts to turn the shaft approximately 180° during the remainder of each rotation of the wheel, said cam means including a cam on the wheel spaced from said shoulder, there being a notch in the shoulder outwardly of the cam, faces on said shoulder tangent to the said portion of the shoulder and joining opposite walls of the notch, and faces on the outer side of the cam spaced from and parallel to the tangential faces, the parallel faces being operable to guide one of said lock parts into and out of the notch.

4. An intermittent movement mechanism of the character described including, a continuously rotating wheel having an annular internal shoulder, a shaft, a cross arm on the shaft, lock pins on the cross arm spaced apart diametrically relative to the shaft, the shoulder having a portion designed to co-operate with the lock pins to hold the shaft against rotation during the greater part of each rotation of the wheel, and means for turning the shaft approximately one-half of a revolution during the remaining part of each rotation of the wheel, said means including a cam on the wheel, the shoulder having a notch and tangential parts at opposite sides of the notch, a cam face on the cam spaced from and substantially parallel with the tangential parts, the cam face and the tangential parts being operable to slidably engage a pin to guide it into and out of the notch.

5. An intermittent movement mechanism of the character described including, a continuously rotating wheel having an annular internal shoulder, a shaft, a cross arm on the shaft, lock pins on the cross arm spaced apart diametrically relative to the shaft, the shoulder having a portion designed to co-operate with the lock pins to hold the shaft against rotation during the greater part of each rotation of the wheel, and means for turning the shaft approximately one-half of a revolution during the remaining part of each rotation of the wheel, said means including a cam on the wheel, the shoulder having a notch and tangential parts at opposite sides of the notch, a cam face on the outer edge of the cam spaced from and substantially parallel with the said tangential parts, the cam face and the said tangential parts being operable to slidably engage one pin to guide it into and out of the notch, and a cam face on the inner edge of the cam for slidably engaging the other pin.

WALTER L. WRIGHT.